United States Patent Office 3,475,459
Patented Oct. 28, 1969

3,475,459
HORDATINE COMPOUNDS AND SYNTHESIS
Albert Stoessl, London, Ontario, Canada, assignor to Canadian Patents and Development Limited, Ottawa, Ontario, Canada, a corporation of Canada
No Drawing. Filed Nov. 23, 1966, Ser. No. 596,438
Int. Cl. C07d 5/36; C07c 129/12, 103/00
U.S. Cl. 260—346.2                                9 Claims

ABSTRACT OF THE DISCLOSURE

Isolation of novel antifungal compounds and derivatives of hordatine from natural sources such as barley coleoptiles and methods of synthesis.

---

This invention relates to novel hordatine derivatives and a process for the manufacture thereof. More particularly this invention relates to hordatine compounds of the formula

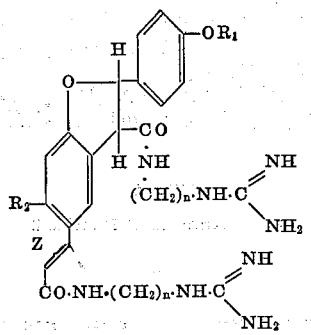

wherein $R_1$ represents hydrogen, acetyl or $\alpha$-D-glucopyranosyl; $R_2$ represents hydrogen or lower alkoxy, preferably methoxy; and $n$ represents an integer from 1 to 4 (preferably 4). When $R_1$ and $R_2=H$, the compound is designated hordatine A; when $R_1=H$ and $R_2=$methoxyl the compound is designated hordatine B and Z represents a double bond or two hydrogen atoms.

The products of this invention are prepared by a method of oxidative phenol coupling utilizing the procedures of Freudenberg (Ber. 76, 997 (1943) and H. Nimz, et al., Ber. 96, 2086 (1963)), and applying these procedures to particularly chosen substrates such as coumaroylagmatine acetate which can be prepared from a condensation of methyl-trans-p-coumarate and agmatine monohydrochloride.

As the chemical structure of hordatine and its derivatives contain asymmetric carbon atoms they are therefore capable of existing in optically active forms (enantiomers). Because of the difficulty of representing these structural differences in graphic formulae, the customary structural formulae have been used in both the specification and the claims without distinction as to the particular structural and optical configuration of the compounds. However it should be expressly understood that while no notation has been used to make the distinction referred to above, the formulae used are to be interpreted in the generic sense, that is as representing either separate isomers or the optical racemates. Such a formula does not merely represent the unresolved mixture of isomers. With respect to the cis-trans isomerism of the double bond in the side chain, the above comments regarding optical isomers basically apply to the geometrical isomerism.

Hordatine and its derivatives can also be isolated as one of the antifungal factors, from barley seedlings. However, the extract contains essentially the glucosides of two closely related compounds, hordatine A and hordatine B. Attempts to achieve a resolution of the glucosides from a natural source have been of no avail.

The compounds to which the present invention relates are useful because of their valuable antifungal properties. Thus, for example inhibition data with test organisms in the Standard Spore Drop Assay are shown below:

EXAMPLE 1

TABLE I

| Concentration (p.p.m.)+ | Percent Inhibition ||||||
|---|---|---|---|---|---|---|
|  | 80 | 40 | 20 | 10 | 5 | 2.5 |
| ±Hordatine A | 100 | 100 | 100 | 100 | 80 | 0 |
| ±Hordatine A (after irradiation with sunlight) | 100 | 100 | 100 | 0 | 0 | 0 |
| Hordatine A, natural | 100 | 100 | 100 | 100 | 46 | 0 |
| Hordatine A, by methanolysis++ | 100 | 100 | 100 | 100 | 11 | 0 |
| Coumaroylagmatine | 0 | 0 | 0 | 0 | 0 | 0 |

+ The acetates were used.
++ Contained some cis isomer ($\lambda_{sh}$. 280).

TABLE II.—TEST ORGANISM: *MONILINIA FRUCTICOLA*

|  | Percent Inhibition of Germination ||||||
|---|---|---|---|---|---|---|
|  | 80 | 40 | 20 | 10 | 5 | 2.5 |
| Concentration, p.p.m.: |  |  |  |  |  |  |
| A | 100 | 100 | 100 | 100 | 11 | 0 |
| B | 100 | 100 | 100 | 100 | 28 | 0 |
| C | 100 | 100 | 100 | 100 | 35 | 0 |
| D | 0 | 0 | 0 | 0 | 0 | 0 |
| E | 0 | 0 | 0 | 0 | 0 | 0 |

A=+—hordatine A diacetate (by methanolysis of glucoside).
B=+—hordatine A diacetate (naturally occurring).
C=±—hordatine A diacetate (synthetic).
D=Coumaroylagmatine acetate.
E=Agmatine diacetate.

TABLE III.—TEST ORGANISM: *MONILINIA FRUCTICOLA*

|  | Percent Inhibition of Germination ||||||
|---|---|---|---|---|---|---|
|  | 80 | 40 | 20 | 10 | 5 | 2.5 |
| Concentration, p.p.m.: |  |  |  |  |  |  |
| A | 100 | 100 | 100 | 100 | 80 | 0 |
| B | 100 | 100 | 100 | 0 | 0 | 0 |
| C | 100 | 100 | 100 | 100 | 46 | 0 |
| D | 100 | 100 | 100 | 100 | 11 | 0 |
| E | 100 | 100 | 46 | 0 | 0 | 0 |
| F | 0 | 0 | 0 | 0 | 0 | 0 |
| G | 11 | 0 | 0 | 0 | 0 | 0 |

A=±—hordatine A diacetate, synthetic, trans isomer.
B=±—hordatine A diacetate, synthetic, cis isomer.
C=+—hordatine A diacetate, natural, trans isomer.
D=+—hordatine A diacetate, by methanolysis of glucoside, containing some cis isomer.
E=+—dihydrohordatine A diacetate, containing a little +—hydrohordatine B.
F=Coumaroylagmatine acetate.
G=Agmatine diacetate.

TABLE IV

[Substrate=+—hordatine B diacetate]

|  | Percent Inhibition of Germination ||||
|---|---|---|---|---|
| Substrate Concentration, p.p.m. | 40 | 20 | 10 | 5 | 2.5 |
| Test Organism, *Monilinia fructicola* | 100 | 100 | 100 | 100 | 0 |
| Test Organism, *Glomerella cingulata* | 100 | 100 | 44 | 0 | 0 |

TABLE V

[Substrate: hordatine glucosides diacetates]

|  | Percent Inhibition of Germination ||||
|---|---|---|---|---|
| Substrate concentration, p.p.m. | 28 | 14 | 7 | 3.5 |
| Test Organism, *M. fructicola* | 100 | 100 | 67 | 0 |
| Test Organism, *G. cingulata* | 0 | 0 | 0 | 0 |

TABLE VI
[Substrate: coumaroylagmatine acetate]

| Substrate concentration, p.p.m. | Percent Inhibition of Germination | | | |
|---|---|---|---|---|
| | 80 | 40 | 20 | 10 |
| Test Organism, *M. fructicola* | 42 | 0 | 0 | 0 |
| Test Organism, *G. cingulata* | 0 | 0 | 0 | 0 |

TABLE VII.—TEST ORGANISM: *MONILINIA FRUCTICOLA*
[Substrate: ±-hordatine A diacetate (synthetic)]

| Concentration of $CaSO_4$, p.p.m.: | Percent Inhibition of Germination | | | | | |
|---|---|---|---|---|---|---|
| 40 | 100 | 34 | 0 | 0 | 0 | 0 |
| 20 | 100 | 100 | 11 | 0 | 0 | 0 |
| 10 | 100 | 100 | 46 | 0 | 0 | 0 |
| 5 | 100 | 100 | 100 | 8 | 0 | 0 |
| 2.5 | 100 | 100 | 100 | 34 | 0 | 0 |
| 0 | 100 | 100 | 100 | 86 | 0 | 0 |
| Concentration of substrate, p.p.m. | 40 | 20 | 10 | 5 | 2.5 | 0 |

TABLE VIII.—TEST ORGANISM: *GLOMERELLA CINGULATA*

| Concentration of $CaSO_4$, p.p.m.: | Percent Inhibition of Germination | | | | | |
|---|---|---|---|---|---|---|
| 40 | 10 | 0 | 0 | 0 | 0 | 0 |
| 20 | 100 | 5 | 0 | 0 | 0 | 0 |
| 10 | 100 | 42 | 0 | 0 | 0 | 0 |
| 5 | 100 | 100 | 14 | 0 | 0 | 0 |
| 2.5 | 100 | 100 | 59 | 0 | 0 | 0 |
| 0 | 100 | 100 | 96 | 35 | 0 | 0 |
| Concentration of substrate, p.p.m. | 40 | 20 | 10 | 5 | 2.5 | 0 |

TABLE IX.—TEST ORGANISM: *HELMINTHOSPORIUM SATIVUM*

| Substrate concentration, p.p.m. | 160 | 80 | 40 | 20 | 10 | 5 |
|---|---|---|---|---|---|---|
| Percent Inhibition of Germination | 100 | 100 | 100 | 100 | 0 | 0 |

EXAMPLE 2

Isolation of hardatines (natural)

Unless specified otherwise the following terminology applies:

Melting points were determined on the Kofler block, optical rotations on 1% solution in water. Ultraviolet spectral constants are for solutions in 96% ethanol. Analytical and preparative thin layer chromatography (TLC) was on a microcrystalline cellulose (FMC Corporation, American Viscose Division, Newark, Del., U.S.A.) with the upper phase of n-butanol-acetic acid-water (4:1:5) as irrigant and diazotized nitraniline, bromocresolgreen or the Sakaguchi reagent as indicators. Countercurrent distributions (CD) were by the single withdrawal procedure (for terminology and symbols, see E. Hecker, Verteilungsverfahren im Laboratorium, Verlag Chemie, Weinheim 1955) using 100 elements (25 ml. each phase) and the above solvent system. Distributions and other lengthy processes on dilute solutions were carried out in the dark or in orange light.

In a typical run, the basic material (5.7 g.) obtained by ion-exchange of the hot water extract of 6-day old barley coleoptiles (4.3 kg. freshweight), was fractionated by CD (300 transfers). After analysis (UV and TLC), suitable fractions were combined (Table X), evaporated to dryness in vacuo, dissolved in 96% ethanol and filtered from insolubles after several days.

TABLE X.—COUNTERCURRENT DISTRIBUTION OF METABOLITES

| r fractions | ρ fractions | Combined fractions | Weight (mg.) |
|---|---|---|---|
| 39–44 | | A | 632 |
| 45–51 | | B | 610 |
| 52–56 | | C | 411 |
| 57–64 | | D | 126 |
| 65–99 | 199–0 | E | 582 |

Fractions B and C (hordatine M) consisted of mixture of the glucosides of trans- and cis-hordatines A and B.

For the constants quoted in Table XI, the fractions were precipitated as the picrates, washed with water and reconverted into the acetate form by ion-exchange.

TABLE XI.—PHYSICAL CONSTANTS OF HORDATINE M FRACTIONS

| Fraction: | $\lambda\lambda^1_{max.}$ ($H_2O$) | 1% $E_{1cm}$ | 23° $[\alpha]_D$ | $R_f{}^2$ |
|---|---|---|---|---|
| B | 312, 300, 223 | 218, 214, 300 | +53° | .28(minor) .33, .37 |
| C | 308, 297, 223 | 231, 234, 289 | +60° | .28(minor) .33, .37 |

[1] Unchanged by addition of alkali.
[2] Low concentration (≯.01 mg. per spot) is required for resolution.

In another run, the picrate was reprecipitated repeatedly by slow concentration of its solution in 96% ethanol. The waxy solid (slow liquefaction above 115° C.) had $\lambda_{max}$ 357, 320, 224mμ (ε 29,400, 31,500, 48,800).

*Analysis.* — Calcd. for $C_{34}H_{48}N_8O_9 \cdot 2C_6H_6N_3O_7$: C, 47.19; H, 4.65; N, 16.75; O, 31.43; $OCH_3$, 0.0. Found: C, 47.29; H, 5.17; N, 16.23; O, 31.64; $OCH_3$, 0.0.

Fraction E: Material derived from six runs was combined and refractionated according to FIG. A.

Fraction E–III–1 (hordatine A, $R_1=H$ and $R_2=H$ and n represents 4, 99 mg. $R_f$ 54) had $\alpha_D{}^{23°}+69°$, $\lambda\lambda_{max}$ 307, 298, 229mμ (ε 18,400, 18,400, 20,700) in neutral, and $\lambda\lambda_{max}$ 305, 297, 235mμ (ε 18,700, 19,400, 17,000) in alkaline solution. The dipicrate, reprecipitated by careful concentration of its solution in warm methanol, was microcrystalline, M.P. 127–8° C., $\lambda\lambda_{max}$ 358, 319, 229 mμ (ε 29,200, 30,200, 45,500).

*Analysis.* — Calcd. for $C_{28}H_{38}N_8O_4 \cdot 2C_6H_3N_3O_7$: C, 47.62; H, 4.40; N, 19.44. Found: C, 47.79; H, 4.57; N, 19.34.

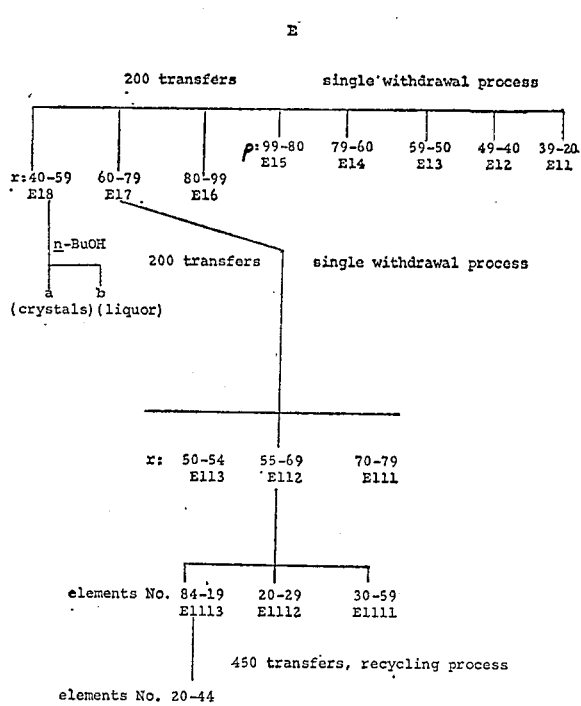

FIGURE A

Refractionation of Fraction E

Fraction E–IV (hordatine B, $R_1=H$, $R_2=OMe$ and n=4) 22 mg. $R_f$ 53) had $\alpha_D{}^{23°}+54°$, $\lambda\lambda^{H_2O}_{max.}$ 316, 301, 224 (ε 16,200), 15,500, 22,000)

The dipicrate, recrystallized as above, had M.P. 132–5° C., $\lambda\lambda_{max}$ 355, 332, 228 mμ (ε 31,000, 35,000, 52,000).

*Analysis.* — Calcd. for $C_{29}H_{40}N_8O_5 \cdot 2C_6H_3N_3O_7$: C, 47.50; H, 4.47; N, 18.92; O, 29.33. Found: C, 47.53; H, 4.70; N, 18.88; O, 29.01.

EXAMPLE 3

Photoisomerizations

An aqueous solution (1.8%) of hordatine M was irradiated in a Pyrex flask with light from an 85 W. lamp (GE CH-3). Reaction was complete after ca. 40 mins.

($\lambda_{max}$ 277 m$\mu$, $E_{1\,cm.}^{1\%}$ 125)

$R_f$ values of the product were unchanged but the intensities of the two principal spots were reversed. Similar changes were observed for free hordatine and p-methoxycinnamoylagmatine.

EXAMPLE 4

Acetylation of hordatine M

A solution of crude glucoside in acetic anhydride kept at room temperature for 3 days, was evaporated to dryness in vacuo. The product, isolated as a glass by CD (100 transfers, elements 46–52) was soluble in chloroform when freshly prepared. It has $\lambda\lambda_{max}$ 313, 298 m$\mu$ ($E_{1\,cm.}^{1\%}$ 176, 168) and $\nu_{max.}^{CHCl_3}$ 3,300 (NH) 1755 (CH$_3$COO—), 1663 (C=N), 1555, 1410 (CH$_3$COO—) cm.$^{-1}$.

*Analysis.*—Calcd. for $$C_{34}H_{44}N_8O_5(O\cdot COCH_3)_4\cdot 2CH_3COOH$$

CH$_3$CO, 25.8; equiv. wt. 500.5. Found: CH$_3$CO, 25.6; equiv. wt. (titration with mineral acid), 510.

EXAMPLE 5

Hydrogenation of hordatine M

The substance (567 mg.) in acetic acid (5 ml.), was shaken with hydrogen over platinum oxide (30 mg.) for 1 hour. After this essential step (no absorption by sample), the solution was filtered and hydrogenated over fresh catalyst (H$_2$ absorbed, 15.5 ml.; calculated, 15.3 ml. per mole-equiv.).

The product, dihydrohordatine glucoside diacetate, obtained by evaporation, had $\lambda\lambda_{max}$ 282, 220 m$\mu$ ($\epsilon$ 2,600, 18,000), stable to dilute base.

EXAMPLE 6

Methanolysis of hordatine M to hordatine A and hordatine B

The glucoside (860 mg.) was refluxed gently for 1.5 hours in methanol (86 ml.) containing HCl (2% w./v.). The product was evaporated to dryness in vacuo, dissolved in water and filtered through Dowex 2–X8 (OAc$^-$). Filtrate and washings were concentrated to ca. 2 ml. and absorbed on Rexyn CG 51 (H$^+$) (25 ml.).

After thorough washing with water, the Rexyn column was eluted with acetic acid (1 N in 80% methanol).

The eluates from two runs were fractionated by CD (400 transfers) in n-butanol water. Fractions $r$ 61–55 (95 mg.) partially crystallized on evaporation. Handpicked and dried on porous tile, the crystals of hordatine A diacetate, had $\lambda\lambda_{max}$ 305, 298, 229 m$\mu$ ($\epsilon$ 19,800, 19,800, 22,900) (neutral and $\lambda\lambda_{max}$ 305, 297, 238 m$\mu$ ($\epsilon$ 22,600, 23,300, 20,300) (alkaline) and gave 100% inhibition of *Monilinia fructicola* at 5 p.p.m. (standard spore drop assay, Table I). The NMR spectrum showed only a trace of absorption attributable to methoxyl.

EXAMPLE 7

Hordatine A, containing a considerable proportion of the cis isomer, was obtained by the more convenient CD (200 transfers) of a similar hydrolyzate in n-butanol-water-acetic acid. The required fractions ($r$ 84–70), after evaporation and re-solution in water, were extracted with small volumes on n-butanol and ether (extracts discarded) and then precipitated with picric acid. After washing with water, the salt had $\lambda\lambda_{max}$ 359, 320, 228 m$\mu$ ($\epsilon$ 30,600, 29,100, 48,000). The IR spectrum was indistinguishable from that of natural hordatine A dipicrate (metabolite fraction E III–1). After reconversion into the acetate form, the product had $\alpha_D^{23°}+68°$, $\lambda\lambda_{max}$ 297, 229 m$\mu$ ($\epsilon$ 15,400, 20,600) and a shoulder at 285 m$\mu$ (cis-isomer).

EXAMPLE 8

Similar purifications as of Example 7, of fractions $r$ 69–60 afforded material rich in hordatine B, with

$\lambda\lambda_{max}$ 315, 300, 229 m$\mu$ ($\epsilon$ 15,100, 15,300, 22,000). In the NMR a broad singlet at $\tau$ 5.81 corresponded to ca. 2H.

EXAMPLE 9

Dihydrohordatines

From dihydrohordatine glucoside. The dihydroglucoside (600 mg.) was methanolyzed (2% HCl) as described above. The basic portion was fractionated by CD (300 transfers) and fractions $r$ 84–75 were purified though the picrate and reconverted into the acetate form as described earlier. The product (22 mg.) had $\lambda\lambda_{max}$ 282, 228 m$\mu$ ($\epsilon$ 3,750, 16,400) in neutral, $\lambda\lambda_{max}$ 287, 248 m$\mu$ ($\epsilon$ 4,600, 14,000) in alkaline solution; $\alpha_D^{23°}+49°$; the NMR spectrum did not show a detectable signal due to methoxyl.

Like work-up of fractions $r$ 74–65 afforded a similar product (28 mg.) which exhibited methoxyl absorption (ca. 1H) in the NMR.

EXAMPLE 10

Naturally occurring hordatine A (40 mg.) was hydrogenated in acetic acid (2 ml.) over prereduced platinum oxide (14 mg., 83%). One mole-equivalent of H$_2$ was absorbed. The product obtained on evaporation was identical with the above by NMR and UV spectra, but had $\alpha_D^{23°}+44°$.

EXAMPLE 11

Similar hydrogenation as Example 10 of crude aglucone (84 mg.) followed by CD (700 transfers) gave dihydrohordatine (TLC, UV) containing appreciable amounts of the B component (NMR).

EXAMPLE 12

Synthesis of (±) hordatine A

A stirred solution of coumaroylagmatine acetate (200 mg.) in water (80 ml.) at 30–35° C., containing 0.002 ml. of a 1% solution of horseradish peroxidase in 2.8 M ammonium sulfate was treated dropwise during 16 hours with hydrogen peroxide solution (0.022%, 70 ml.). The solvent was removed in vacuo (40° C.) and the residue distributed by CD (200 transfers). Fractions $r$ 85–54 contained the desired product (68.5 mg., 34 mole-percent, estimated spectrophotometrically), optically inactive but identical with hordatine A in chromatographic behaviour.

The dipicrate precipitated from water as an amorphous solid whose IR spectrum was almost identical with that of hordatine A dipicrate. On careful concentration at room temperature it separated from methanol as an oil which solidified on trituration, M.P. 128–30° C. $\lambda\lambda_{max}$ 359, 318, 229 m$\mu$ ($\epsilon$ 29,300, 31,300, 47,300).

The diacetate, recovered by ion-exchange of the dipicrate, had $\lambda\lambda_{max}$ 307, 298, 229 ($\epsilon$ 19,600, 19,700, 22,100) (neutral) and $\lambda\lambda_{max}$ 305 (sh.), 297, 238 m$\mu$ ($\epsilon$ 20,000, 20,700, 20,000) (alkaline). The NMR spectrum was identical with that of hordatine A within experimental error. Inhibition data, with *Monilinia fructicola* as test organism in the standard spore drop assay are given in Example 1.

EXAMPLE 13

A solution of coumaroylagmatine acetate (98 mg.) in potassium ferricyanide (0.005 M, 55 ml.) was adjusted to pH 10 with a base. After 48 hours at room temperature, it was placed in the first two elements of a Craig machine (see Example 2) and fractionated (100 transfers). Fractions r 79–52 contained unchanged starting material (TLC; appr. 45 mg. spectrophotometrically). The residue obtained on evaporating fractions r 46–39 was dissolved in water and treated with picric acid. The precipitated salt was purified as described above; the product (7 mg., M.P. 123–26° C., mixed M.P. 124–29° C.) was indistinguishable from hordatine A dipicrate by TLC and UV and IR spectra.

EXAMPLE 14

Isolation of p-coumaroylagmatine (1-[trans-p-hydroxycinnamoylamino]-4-quanidinobutane)

Countercurrent distribution of metabolic products.— The basic fraction of the water-soluble products of young barley shoots was obtained by ion-exchange. The fraction (4.5–6.5 g.) was distributed by the single withdrawal procedure in n-BuOH:H$_2$O:HOAc(4:5:1)(100× 25 ml. lower phase; 300× 25 ml. upper phase). Fractions $\rho=0$ to $\rho=199$ were collected together and evaporated to dryness in vacuo. The products of five such runs (from a total of 20 kg. of barley shoots) were combined, the aqueous solution washed with ether and the ether-insoluble material redistributed in the same solvent system (100× 25 ml. lower phase, 169× 25 ml. upper phase). Tubes $\rho=49$ to $\rho=58$ contained material (30 mg., $\lambda_{max.}$ 290 m$\mu$, $E_{1cm.}^{1\%}$ 330)

which gave rise to a single basic Sakaguchi-positive spot, $R_f$ 0.7 (in n-BuOH-H$_2$O-HOAc 4:5:1, Whatman No. 1 paper). Tubes $\rho=59$ to $\rho=68$ contained similar material (35 mg.) of $E_{1cm.}^{1\%}$ 455

Isolation of the picrate

On addition of picric acid to the above-materials in water (3 ml.), a precipitate separated which crystallized on standing. After washing with water, the salt (50 mg.) had M.P. 214°, raised to 215–217° by recrystallization from aqueous methanol and aqueous ethanol. It had $\lambda\lambda_{max}$ 355, 310, 292 (sh.) and 223 m$\mu$ ($E_{1cm.}^{1\%}$ 291, 493, 451, 512 respectively)

EXAMPLE 15

Synthesis of p-coumaroylagmatine p-Coumaroylagmatine picrate.—Agmatine dihydrochloride (153 mg.) was evaporated in vacuo from 1 N sodium hydroxide solution (0.76 ml., 1 mol-equiv.). The product was heated together with methyl-trans-p-coumarate (270 mg., 2.0 mol-equiv.) at 120° C. for 24 hr., taken up in water containing a little methanol and washed with several portions of ether. The aqueous fraction, on repeated preparative thin-layer chromatography furnished the desired product as a syrup (75 mg.) which was precipitated from water as the picrate. After recrystallization from aqueous ethanol, the salt had M.P. 215–218° dec., also on admixture with the picrate of the natural compound. (Found: C, 47.9; H, 4.7; N, 19.1. C$_{20}$H$_{23}$N$_7$O$_9$ required: C, 47.5; H, 4.6; N, 19.4%.) Infrared spectra (Nujol mull and solution in dimethylsulphoxide) of the two preparations were identical, as were also the U.V. spectra. The chromatographic behaviour of both products, in four different systems, was identical except that a small amount of an impurity could be detected in the synthetic material.

Conveniently agmatinemonohydrochloride is condensed with methyl-trans-p-coumarate to give coumaroylagmatine, isolated as either the acetate or the picrate. Then for example oxidative phenol coupling of coumaroylagmatine acetate leads to hordatine A.

In general the temperature and time at which the subject reactions are conducted do not appear to be critical. At the preferred reaction temperatures, highly satisfactory results can be obtained by permitting the oxidative phenol coupling to proceed for about 16 hours. In a preferred aspect of the invention a solvent such as water is used, and the solvent is preferably one in which the reaction agents are soluble therein. Other suitable solvents are lower alcohols. In an alternate synthesis it is preferred to use potassium ferricyanide and the pH adjustment is made with any suitable base. The reaction proceeds over a period of several days at ambient temperatures. However the temperature and time does not appear to be critical.

EXAMPLE 16 p-Methoxycinnamoylagmatine hydrochloride p-Methoxycinnamic acid, 185 mg., was refluxed with thionyl chloride (1 ml.) for 10 min. The residue after evaporation was treated overnight with agmatine sulphate (230 mg.) in pyridine (2 ml.) at room temperature. The solid was filtered off, washed with a few drops of pyridine and extracted with methanol (8 ml., 5 ml.) at room temperature. Filtration of the methanol-soluble material through Dowex 2–X–8 (Cl$^-$) in water afforded the desired product as the hydrochloride (96 mg.). After repeated recrystallization from water, it had M.P. 212–215° and $\lambda\lambda_{max}$ 304, 290, 223 m$\mu$ ($\epsilon$ 23,000, 23,900, 14,600) (Found: C, 54.8; H, 6.8; N, 16.9; Cl, 11.1. C$_{15}$H$_{23}$N$_4$O$_2$ Cl required: C, 55.1; H, 7.1; N, 17.2; Cl, 10.9%).

EXAMPLE 17

Methylation of p-coumaroylagmatine

The hydrochloride (6.5 mg.) derived by ion-exchange from metabolite picrate was refluxed for 30 min. in methanol (2 ml.) together with potassium carbonate (60 mg.) and dimethylsulphate (0.038 ml.). After dilution with water, the solution was filtered in turn through Dowex 2–X8 (OAc$^-$) and Rexyn CG 51 (H+). The latter column was washed with water and eluted with 2 N acetic acid (75 ml.). Preparative chromatography (on Avicel, three plates, as above) of the eluate gave the desired methyl ether (located by U.V. absorption). After evaporation from a few drops of 0.1 N hydrochloric acid, it crystallized from methanol acetone. Recrystallized from water, it had M.P. 207–210°, and M.P. 209–213° on admixture with the authentic p-methoxycinnamoylagmatine hydrochloride. The U.V. (unchanged by addition of OH$^-$) and I.R. (KBr disc) spectra of the two specimens were, respectively, identical.

Similar methylation of synthetic p-coumaroylagmatine gave the same compound, again characterized by M.P., mixed M.P., U.V. and I.R. spectra.

I claim:
1. A compound of the formula:

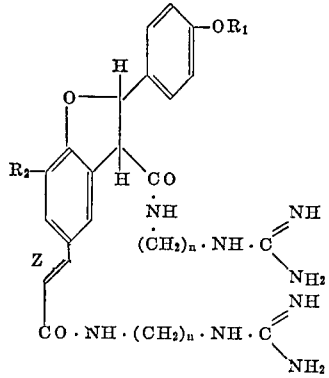

wherein R$_1$ represents hydrogen, or acetyl or R$_2$ represents hydrogen, or lower alkoxy; $n$ represents an integer from 1 to 4 and Z is selected from the group consisting of a double bond or two hydrogen atoms and the diacetates thereof.

2. A compound of the formula:

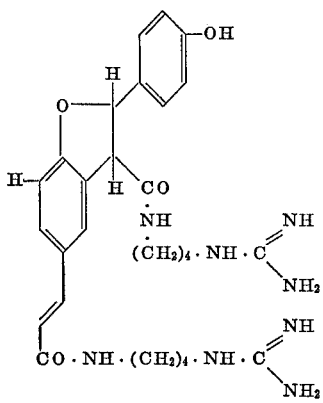

3. A compound of the formula:

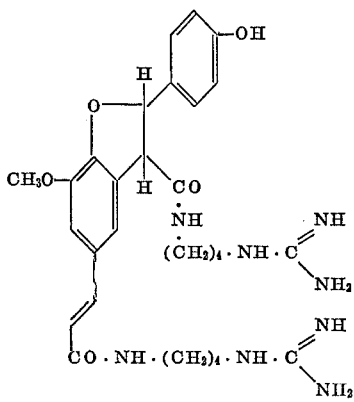

4. The process for preparing the compound of claim 2 which comprises reacting agmatinemonohydrochloride with methyl-trans-p-coumarate and dissolving the product of the above reaction in potassium ferricyanide and adjusting the solution to a pH of about 10 with a suitable base and allowing the reaction to proceed for about 48 hours at ambient temperatures and then isolating the desired compound.

5. The process for preparing the compound of claim 2 which comprises treating coumaroylagmatine acetate dissolved in potassium ferricyanide by adjusting the pH with a base and after a period of time isolating the compound of claim 2.

6. Dihydrohordatine diacetate.

7. Hordatine A diacetate.

8. A compound according to claim 1 which is dihydro hordatine A.

9. A compound according to claim 1 which is dihydro hordatine A.

References Cited

Stoessl: Chem. Abstracts, vol. 65, p. 2195 (1966).

ALEX MAZEL, Primary Examiner

B. I. DENTZ, Assistant Examiner

U.S. Cl. X.R.

195—51, 104; 260—210, 559; 424—285

UNITED STATES PATENT OFFICE
CERTIFICATE OF CORRECTION

Patent No. 3,475,459                        October 28, 1969

Albert Stoessl

It is certified that error appears in the above identified patent and that said Letters Patent are hereby corrected as shown below:

Column 3, line 39, "hardatines" should read -- hordatines --. Column 10, line 19, "A" should read -- B --.

Signed and sealed this 21st day of April 1970.

(SEAL)
Attest:

Edward M. Fletcher, Jr.
Attesting Officer

WILLIAM E. SCHUYLER, JR
Commissioner of Patents